United States Patent [19]

Syrier et al.

[11] Patent Number: 4,994,513

[45] Date of Patent: Feb. 19, 1991

[54] POLYKETONE COPOLYMER COMPOSITION COMPRISING AMIDE OR ALUMINUM COMPOUND

[75] Inventors: Johannes L. M. Syrier; Dirk A. Borger; Johan M. Beyen; Antonius A. Broekhuis; Franciscus C. Groenland, all of Amsterdam, Netherlands

[73] Assignee: Shell Oil Company, Houston, Tex.

[21] Appl. No.: 452,486

[22] Filed: Dec. 19, 1989

Related U.S. Application Data

[63] Continuation-in-part of Ser. No. 296,651, Jan. 13, 1989, abandoned.

[30] Foreign Application Priority Data

Jan. 27, 1988 [GB] United Kingdom ............... 8801756
Jan. 24, 1989 [EP] European Pat. Off. ........ 89200149.6

[51] Int. Cl.$^5$ .................... C08J 5/21; C08F 283/00
[52] U.S. Cl. .................... 524/210; 524/230; 524/233; 525/539
[58] Field of Search ............ 524/210, 230, 233; 525/539

[56] References Cited

U.S. PATENT DOCUMENTS

| | | | |
|---|---|---|---|
| 2,495,286 | 1/1950 | Brubaker | 528/392 |
| 3,689,460 | 9/1972 | Nozaki | 528/392 |
| 3,694,412 | 9/1972 | Nozaki | 528/392 |
| 3,948,873 | 4/1976 | Hudgin | 528/392 |
| 4,761,448 | 8/1988 | Kluttz et al. | 524/381 |
| 4,818,811 | 4/1989 | Drent | 528/392 |
| 4,843,144 | 6/1989 | VanBroekhoven et al. | 528/392 |
| 4,880,903 | 11/1989 | VanBroekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 5/1987 | European Pat. Off. . |
| 257663 | 3/1988 | European Pat. Off. . |
| 288124 | 10/1988 | European Pat. Off. . |
| 289077 | 11/1988 | European Pat. Off. . |
| 1081304 | 8/1967 | United Kingdom . |
| 2204043A | 11/1988 | United Kingdom . |

*Primary Examiner*—Harold D. Anderson
*Assistant Examiner*—T. Mosley
*Attorney, Agent, or Firm*—Denise Y. Wolfs

[57] ABSTRACT

Polyketone polymer composition comprising a major amount of an alternating copolymer of carbon monoxide and an olefinically unsaturated compound and a minor amount of at least one additive, selected from: (a) the acid amides of monocarboxylic or polycarboxylic acids having from 5 to 30 carbon atoms and being optionally N-monosubstituted or N,N-disubstituted with $C_1$ to $C_4$ alkyl groups, and (b) aluminum compounds of formula $Al(OX)_3$, in which X stands for a hydrogen atom or a $C_1$ to $C_4$ alkyl group.

21 Claims, No Drawings

POLYKETONE COPOLYMER COMPOSITION COMPRISING AMIDE OR ALUMINUM COMPOUND

RELATED APPLICATION

The subject application is a continuation-in-part of application Ser. No. 296,651, filed Jan. 13, 1989, now abandoned, Dec. 22, 1989.

BACKGROUND OF THE INVENTION

The present invention relates to polyketone copolymer compositions comprising certain additives. The relevant copolymers are characterized by having an alternating structure $[A-CO]_n$ in which a unit A is positioned left and right in between carbon monoxide units. A is a unit derived from an olefinically unsaturated compound. The term "copolymer" includes terpolymers in which different units A are present. As an example of suitable terpolymers reference is made to a copolymer of ethene, carbon monoxide and propene or butene. Other suitable monomers yielding a unit A are e.g. styrene, butene, octene and acrylate esters.

The relevant alternating copolymers and their methods of preparation are known per se, U.S. Pat. No. 3,694,412, and European Patent Applications 121,965 and 181,014. While these copolymers have attractive physical and mechanical properties such as yield stress, tensile strength, impact strength and flexural modulus, their processing performance leaves room for improvement.

Extrusion of copolymer with an intrinsic viscosity, or limited viscosity number (LVN) above 2.0 dl/g (measured at 60° C. in m-cresol) is adversely affected by poor melt flow. Since copolymers with a high LVN have better physical properties, and would be very successful as fiber material and as engineering thermoplastics, this problem needs to be solved. Especially in fiber applications, melt-extrusion is a critical step, even for copolymers with a low LVN.

It has been found now that the melt flow properties of the above-mentioned polyketones can be improved by incorporating certain additives selected from acid amides and aluminium-oxygen compounds. The better melt flow properties allow processing, such as extrusion, to be carried out more easily, with less intrinsic friction, i.e. less local heating and degradation of the polymer. It has been found too that certain additives, when used in combination, show synergy, and that other additives, which are known per se as antioxidants for other polymers, act as melt flow improvers as well, when used in combination with the first mentioned amides or aluminium-oxygen compounds.

SUMMARY OF THE INVENTION

The invention relates to a novel polyketone polymer composition comprising a major amount of an alternating copolymer of carbon monoxide and an olefinically unsaturated compound and a minor amount of at least one additive, characterized in that the additive(s) is/are selected from: (a) the acid amides of monocarboxylic or polycarboxylic acids having from 5 to 30 carbon atoms and being optionally N-monosubstituted or N,N-disubstituted with $C_1$ to $C_4$ alkyl groups, and (b) aluminium compounds of formula $Al(OX)_3$, in which X stands for a hydrogen atom or a $C_1$ to $C_4$ alkyl group.

DESCRIPTION OF THE INVENTION

The expression "a minor amount" will be clear to those skilled in the art. Generally it will not be necessary to employ more than a certain amount of additive to reach an acceptable performance. Suitably, from 0.01 to 5.0 wt %, especially from 0.01 to 3.0 wt %, of additive is used. The weight percentage relates to the global amount of melt-flow improving additive, based on the total weight of the composition.

Various amides of monocarboxylic or polycarboxylic acids, especially dicarboxylic acids may be used. Examples of suitable amides are thus the bis-amides of dicarboxylic acids such as succinic, maleic or terephthalic acid, but preferred are the amides of aliphatic monoacids having relatively long carbon chains. However, benzamide and derivatives give good results as well. Thus, preferably the acid amide has the general formula

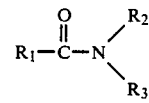

in which $R_1$ is an optionally substituted hydrocarbyl group with from 5 to 27 carbon atoms, and $R_2$ and $R_3$ each independently are hydrogen atoms or alkyl groups with from 1 to 4 carbon atoms. In particular, $R_1$ is selected from optionally substituted aliphatic groups having 10 to 27 carbon atoms and optionally substituted phenyl groups, and $R_1$ is especially an alkyl group or an olefinically unsaturated hydrocarbyl group, such as linoleic acid amide. More preferably, $R_1$ represents a group of formula $H(CH_2)_xCH=CH(CH_2)_y-$, or of formula $H(CH_2)_{x+y+2}-$, the sum of x and y being 8 to 25.

Suitable examples of the latter class are unsaturated alkyl amides such as oleic acid amide (x+y=7) and particularly erucamide (x=8 and y=11), or saturated alkyl amides such as lauric acid amide (x+y=9), myristyl amide (x+y=11), palmityl amide (x+y=13), stearyl amide (x+y=15) or montanyl amide (x+y=25).

Most preferred amide additives are those in which $R_2$ and $R_3$ are hydrogen atoms or methyl groups, especially those in which both are hydrogen.

The aluminium compounds suitable in the present compositions are either aluminium hydroxide of formula $Al(OH)_3$, in its various known forms such as with or without crystal water, in dry or gel form, or even mixed with other aluminium oxygen compounds, such as in natural boehmite or diaspore or in (hydrated)trioxide, or they are alkoxide compounds of formula $Al(OX)_3$, in which X stands for a hydrogen atom or a $C_1$ to $C_4$ alkyl group, e.g. aluminium ethoxide, propoxide or isopropoxide.

Especially suitable is the hydroxide also called natural bayerite, of formula $Al_2O_3.3H_2O$ (which can be thought of as $2Al(OH)_3$ molecules). Natural gibbsite or hydrargilite having the same molecular formula may be used as well. Another very suitable compound is aluminium isopropoxide of formula $Al(OC_3H_7)_3$, especially when the processing time can be kept shorter than about 15 minutes (longer periods sometimes destabilize the composition).

It has been found that when using aluminium compounds as melt flow improvers, an unexpected synergistic effect is obtained by the co-addition of an aromatic amine known per se as an antioxidant, such as bis(7-phenyl-p-cumenyl)amine. Other suitable aromatic amines are mentioned in European Patent Application 288,124.

It has also been found that very advantageous results are obtained, in general, when along with the melt flow improving additives of the invention, an antioxidant additive is present, in a minor amount, of e.g. 0.01–3.0 wt %. Very suitable antioxidant additives have been found to be the sterically hindered phenolic compounds, which are commercially available, e.g. under the trademarks Irganox ® or Ionol ®. Preferably the sterically hindered phenolic compound is selected from 2,5-dialkylphenols, from esters of a straight chain alcohol and a hydroxy, alkylphenyl-substituted carboxylic acid, from diesters of a polyoxyalkylene glycol and a hydroxy,alkylphenyl-substituted carboxylic acid, from 1,2-bis(acetyl)hydrazines in which the acetyl group carries a hydroxy,alkylphenyl substituent, and from alpha-N,omega-N-bis(acetyl)diamines in which the acetyl group carries a hydroxy,alkylphenyl substituent.

Preferred copolymers are those having a LVN of at least 1.4 dl/g, more preferably at least 2.1 dl/g. Other preferred groups of copolymers are CO/ethene copolymers and ethene/CO/propene terpolymers.

The compositions of this invention can be processed into articles of manufacture such as fibers, films, laminates, tubes, piping and articles having an intricate shape by conventional processing techniques such as melt-spinning, extrusion, co-extrusion, injection molding, and compression molding.

The additives used in this invention not only improve the flow of the relevant CO/olefin copolymers and terpolymers, but also render the copolymers and terpolymers less prone to polymer degradation during melt-processing. Both improvements are unexpected. Thus, they render processable certain types of polyketones which were hardly processable before the present invention.

The best mode of operating this invention is elucidated in the Examples disclosed below, which are not to be construed as limiting the invention.

EXAMPLE 1

Copolymer compositions comprising ethene-/propene/carbon monoxide copolymer having a LVN of 1.8 dl/g and a crystalline melting point 226° C., and being thermostabilized with a mixture of 0.3 wt % 2,5-di-t-butyl-4-methylphenol and 0.6 wt % of the n-octadecyl ester of 3-(3,5-di-t-butyl-4-hydroxyphenyl)-propanoic acid, were extruded at 240° C. with a 5.00 kg load through a die with a 2.096 mm diameter orifice. By varying the position of the piston in the barrel (internal barrel diameter 9.55 mm) the residence time of the composition in the barrel was varied. Melt flow index (MFI) versus residence time is set out in Table 1 below. The reference composition (a) and the composition of this invention (b) comprised, respectively, none and 0.1 wt % erucamide.

TABLE 1

| | Melt Flow Index (MFI) vs. Residence Time | | | | | |
|---|---|---|---|---|---|---|
| | 8 min | | 10 min | | 12 min | |
| | a | b | a | b | a | b |
| MFI (g/10 min) | 2.2 | 7.9 | 1.7 | 5.8 | 1.4 | 3.9 |

EXAMPLE 2

In a commercial L/D 28 twin-screw extruder comprising a crammer-feeder and venting-section, and having a screw diameter of 0.6 m, extrusion tests were performed.

A reference ethene/CO/propene terpolymer composition having a crystalline melting point of 218° C., a LVN of 2.27 dl/g, and a bulk density of 122 kg/m³ was extruded in the absence of additives of the invention. The die of the extruder got clogged and blocked within a few minutes. Further extrusion was impossible.

An ethene/CO/propene terpolymer composition having a crystalline melting point of 212° C., a LVN of 2.12 dl/g, and a bulk density of 77 kg/m³ was extruded with 0.1 wt % erucamide. The extrusion continued for more than 2 hours without any problems. This clearly demonstrates the remarkable improvement of melt flow of samples with erucamide over compositions, without such additive.

EXAMPLE 3

A polyketone terpolymer comprising ethene, propene and carbon monoxide, having a LVN of 1.40 dl/g (measured at 60° C. in m-cresol), a crystalline melting point of 220° C., and a bulk density of 110 g/ml was converted into a granulate on a short screw extruder. Samples with various amides were prepared in the same way as in Example 1, i.e. by means of a roller mixer, running at low speed for 6 hours. The melt stability was measured using a commercial torque rheometer under standard conditions, as in Example 1. The results are presented in Table 2.

TABLE 2

| | Melt Stability | | |
|---|---|---|---|
| Additive (wt %) | Initial melt torque (Nm) | Max. Torque (Nm) | Time to max torque (min) |
| None | 4.7 | 32.2 | 10 |
| None | 4.5 | 30.7 | 13 |
| Erucamide (0.5) | 3.9 | 25.6 | 45 |
| Erucamide (0.5) | 3.7 | 23.1 | 55 |
| Erucamide (1.0) | 4.1 | — | >120 |
| Erucamide (1.0) | 4.0 | — | >120 |
| Erucamide (1.0) | 3.8 | — | >120 |
| Laurylamide (1.0) | 3.3 | 22.0 | 100 |
| Laurylamide (1.0) | 3.3 | 19.2 | 100 |
| Stearylamide (0.5) | 3.3 | 26.2 | 26 |
| Stearylamide (0.5) | 3.2 | 28.1 | 24 |
| Stearylamide (1.0) | 2.2 | — | >100 |
| Stearylamide (1.0) | 2.8 | 16.0 | 200 |
| Benzamide (1.0) | 3.9 | 25.0 | 110 |
| Benzamide (1.0) | 4.6 | 24.0 | 120 |

The maximum torque for several samples according to the invention is not given, as most experiments lasted only 120 minutes per sample. When looking at the time for the first signs of cross-linking to occur, a similar trend as for the time to maximum torque was observed. All amides observed acted as a stabilizer, and acceptable results appear to be obtainable using concentrations of about 1 wt %.

EXAMPLE 4

The experiment of Example 3 was repeated using aluminium-based additives, also in combination with amides. The results are given in Table 3.

TABLE 3

Melt Stability

| Additive (wt %) | Initial torque (Nm) | Max. torque (Nm) | Time to first crosslink (min) | Time to max. torque (min) |
| --- | --- | --- | --- | --- |
| None | 4.6 | 32 | 3 | 12 |
| Bayerite (0.2) | 1.9 | 21 | 10 | 200 |
| Stearyl amide (0.5) | 3.0 | 27 | 3 | 26 |
| Stearyl amide/bayerite (0.2/0.2) | 2.8 | 22 | >5 | 270 |

It appears that the time during which the polymer may be processed is prolonged from 12 minutes (using no additive) to 26 or 200 minutes using a single additive, and to 270 minutes using them in combination. Especially the latter, synergistic result is unexpected.

EXAMPLE 5

A number of compositions were prepared starting from an ethene/propene/carbon monoxide terpolymer having a LVN (measured at 60° C. in m-cresol) of 2.85 dl/g, a bulk density of 0.290 g/ml and a melting point of 213° C. Their recipes are shown below in Table 4.

TABLE 4

Compositions

| Additive (wt %) | a* | b* | A | B | C | D | E | F |
| --- | --- | --- | --- | --- | --- | --- | --- | --- |
| Bayerite | — | — | — | 1.5 | 1.5 | 1.5 | — | — |
| Al(OC$_3$H$_7$)$_3$ | — | — | — | — | — | — | 0.3 | 0.3 |
| MD 1024 | 0.7 | 0.7 | 0.65 | 0.65 | 0.65 | 0.65 | 0.65 | 0.65 |
| 245 | — | — | 0.65 | 0.65 | 0.65 | 0.65 | 0.65 | 0.65 |
| 445 | — | — | 0.4 | — | 0.4 | 0.4 | — | 0.4 |

In these compositions, "MD 1024" stands for 1,2-bis(3-(4-hydroxy-3,5-di-t-butylphenyl)propanoyl)-hydrazine, "245" stands for the diester of tris(oxethylene)glycol and 3-(4-hydroxy-3-methyl-5-t-butylphenyl)propanoic acid, and "445" stands for bis(7-phenyl-p-cumenyl)amine. Typically, the additives were suspended in methanol (e.g. 5-7 kg of methanol per 10 kg of terpolymer) and added to the polyketone, followed by drying at 60° C. for approximately 16 hours. Sample a was dried before extrusion, sample b was not. The difference between samples C and D resides in the amount of methanol in which the additives were suspended, prior to their addition to the terpolymer: 5 kg and 7 kg, respectively, on 10 kg of terpolymer.

Analysis of the samples A-F showed that the amounts of all additives were lower than would be expected, which could be due to loss of filtrate during the blending in of the additives.

TABLE 5

Actual Compositions

| Additive (wt %) | A | B | C | D | E | F |
| --- | --- | --- | --- | --- | --- | --- |
| Bayerite | — | 0.702 | 0.3 | 0.234 | — | — |
| Al(OC$_3$H$_7$) | —. | — | — | — | 0.255 | 0.2025 |
| MD 1024 | 0.22 | 0.21 | 0.26 | 0.23 | 0.31 | 0.30 |
| 245 | 0.22 | 0.24 | 0.26 | 0.27 | 0.27 | 0.25 |
| 445 | 0.20 | — | 0.21 | 0.21 | — | 0.21 |

Each sample was tested for its melt flow properites, viscosity behaviour, etc. The melt index of the samples was assesses using standard methods as in Example 1. The results are given below in Table 6.

TABLE 6

Sample Properties

| Property | a | b | A | B | C | D | E | F |
| --- | --- | --- | --- | --- | --- | --- | --- | --- |
| Viscosity (kPa.s) | 8.1 | 9.2 | 4.1 | 3.8 | 3.3 | 3.5 | 4.3 | 4.5 |
| Melting Point (°C.) | 272 | 265 | 267 | 269 | 267 | 274 | 267 | 267 |
| Initial MI at 240° C. (g/10 min) | — | — | 1.3 | 1.8 | 1.9 | 1.9 | 2.1 | 1.9 |
| Initial MI at 260° C. (g/10 min) | — | — | 1.8 | 3.0 | 2.6 | 4.1 | 2.5 | 3.0 |
| Initial MI at 280° C. (g/10 min) | — | — | 2.0 | 5.2 | 5.6 | 8.1 | 3.6 | 5.5 |
| Flexural modulus (ASTM D 790, GPa) | — | — | 1.63 | 1.59 | 1.57 | 1.62 | 1.74 | 1.69 |
| Extrusion performance (visual)* | −1 | −2 | 0 | −0.5 | +1 | +1 | 0 | +1 |

*Scale assessing melt fracture and fouling properties, wherein −2 is very bad and +1 is very good.

What is claimed is:

1. A composition comprising a linear alternating copolymer of carbon monoxide and an olefinically unsaturated compound and, based on the weight of copolymer, from 0.01 to 5.0 wt % of at least one additive, wherein the additive is selected from the group consisting of acid amides of monocarboxylic or polycarboxylic acids having from 5 to 30 carbon atoms and being optionally N-monosubstituted or N,N-disubstituted with C$_1$ to C$_4$ alkyl groups.

2. The composition of claim 1, wherein the composition contains from 0.01 to 3.0 wt % of additive.

3. The composition of claim 2, wherein the acid amide has the general formula

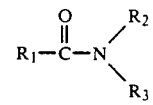

in which R$_1$ is an optionally substituted hydrocarbyl group with from 5 to 27 carbon atoms, and R$_2$ and R$_3$ each independently are hydrogen atoms or alkyl groups with from 1 to 4 carbon atoms.

4. The composition of claim 3, wherein R$_1$ is selected from the group consisting of optionally substituted aliphatic groups having 10 to 27 carbon atoms and optionally substituted phenyl groups.

5. The composition of claim 4, wherein R$_1$ is an alkyl group or an olefinically unsaturated hydrocarbyl group.

6. The composition of claim 5, wherein R$_1$ represents a group of formula H(CH$_2$)$_x$CH=CH(CH$_2$)$_y$— or of formula H(CH$_2$)$_{x+y+2}$—, the sum of x and y being 8 to 25.

7. The composition of claim 6, wherein $R_2$ and $R_3$ are hydrogen.

8. The composition of claim 6, wherein the composition includes as an additional additive an aromatic amine.

9. The composition of claim 6, wherein the composition comprises as an additional additive a sterically hindered phenolic compound selected from the group consisting of: (a) 2,5-dialkylphenols, (b) esters of a straight chain alcohol and a hydroxy,alkylphenyl-substituted carboxylic acid, (c) diesters of a polyoxyalkylene glycol and a hydroxy,alkylphenyl-substituted carboxylic acid, (d) 1,2-bis(acetyl)hydrazines in which the acetyl group carries a hydroxy,alkylphenyl substituent, and (e) alpha-N,omega-N-bis(acetyl)diamines in which the acetyl group carries a hydroxy,alkylphenyl substituent.

10. The composition of claim 6, wherein the composition comprises as the copolymer a copolymer of carbon monoxide, ethene and propene.

11. A composition comprising a linear alternating copolymer of carbon monoxide, ethene, and propene and, based on the weight of copolymer, from 0.01 to 5.0 wt % of two additive selected from the group consisting of stearyl amide and bayerite.

12. The composition of claim 3, wherein the composition comprises as an additional additive an aluminum compound of the formula $Al(OH)_3$, in which X stands for a hydrogen atom or a $C_1$ to $C_4$ alkyl group.

13. The composition of claim 12, wherein the composition includes, as a second additional additive, an aromatic amine.

14. The composition of claim 12, wherein the aluminium compound comprises aluminium hydroxide of formula $Al(OH)_3$.

15. The composition of claim 14, wherein the composition includes as an additional additive an aromatic amine.

16. The composition of claim 14, wherein the composition comprises as an additional additive a sterically hindered phenolic compound selected from the group consisting of: (a) 2,5-dialkylphenols, (b) esters of a straight chain alcohol and a hydroxy,alkylphenyl-substituted carboxylic acid, (c) diesters of a polyoxyalkylene glycol and a hydroxy,alkylphenyl-substituted carboxylic acid, (d) 1,2-bis(acetyl)hydrazines in which the acetyl group carries a hydroxy,alkylphenyl substituent, and (e) alpha-N,omega-N-bis(acetyl)diamines in which the acetyl group carries a hydroxy,alkylphenyl substituent.

17. The composition of claim 14, wherein the composition comprises as the copolymer a copolymer of carbon monoxide, ethene and propene.

18. The composition of claim 12, wherein the aluminium compound comprises aluminium isopropoxide of formula $Al(C_3H_7O)_3$.

19. The composition of claim 18, wherein the composition includes as an additional additive an aromatic amine.

20. The composition of claim 18, wherein the composition comprises as an additional additive a sterically hindered phenolic compound selected from the group consisting of: (a) 2,5-dialkylphenols, (b) esters of a straight chain alcohol and a hydroxy,alkylphenyl-substituted carboxylic acid, (c) diesters of a polyoxyalkylene glycol and a hydroxy,alkylphenyl-substituted carboxylic acid, (d) 1,2-bis(acetyl)hydrazines in which the acetyl group carries a hydroxy,alkylphenyl substituent, and (e) alpha-N,omega-N-bis(acetyl)diamines in which the acetyl group carries a hydroxy,alkylphenyl substituent.

21. The composition of claim 18, wherein the composition comprises as the copolymer a copolymer of carbon monoxide, ethene and propene.

* * * * *